(12) United States Patent
Sekiya

(10) Patent No.: US 9,751,555 B2
(45) Date of Patent: Sep. 5, 2017

(54) STEERING SYSTEM FOR VEHICLE

(71) Applicant: TOYOTA JIDOSHA KABUSHIKI KAISHA, Toyotoa-shi, Aichi-ken (JP)

(72) Inventor: Yoshihide Sekiya, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/896,934

(22) PCT Filed: Jun. 12, 2014

(86) PCT No.: PCT/IB2014/001025
§ 371 (c)(1),
(2) Date: Dec. 9, 2015

(87) PCT Pub. No.: WO2014/203056
PCT Pub. Date: Dec. 24, 2014

(65) Prior Publication Data
US 2016/0159388 A1    Jun. 9, 2016

(30) Foreign Application Priority Data

Jun. 19, 2013   (JP) .................................. 2013-128392

(51) Int. Cl.
*B62D 5/00*   (2006.01)
*B62D 5/04*   (2006.01)

(52) U.S. Cl.
CPC ............. *B62D 5/003* (2013.01); *B62D 5/046* (2013.01); *B62D 5/0409* (2013.01)

(58) Field of Classification Search
CPC ....... B62D 5/003; B62D 5/0409; B62D 5/046
USPC .................................................. 180/405, 407
See application file for complete search history.

(56) References Cited

U.S. PATENT DOCUMENTS

| 7,322,439 | B2 * | 1/2008 | Hara ..................... B62D 5/003 180/402 |
| 7,500,537 | B2 * | 3/2009 | Itoh ....................... B62D 5/003 180/402 |
| 7,708,108 | B2 * | 5/2010 | Miyasaka .............. B62D 5/001 180/402 |
| 2007/0137921 | A1 | 6/2007 | Kasahara |
| 2009/0055050 | A1 | 2/2009 | Onuma et al. |

FOREIGN PATENT DOCUMENTS

| CN | 101142116 A | 3/2008 |
| EP | 1829765 A2 | 9/2007 |
| EP | 1995153 A1 | 11/2008 |
| EP | 2116444 A1 | 11/2009 |
| JP | 2007-137294 A | 6/2007 |
| JP | 2008-290664 A | 12/2008 |

* cited by examiner

*Primary Examiner* — Tony H. Winner
(74) *Attorney, Agent, or Firm* — Oliff PLC

(57) ABSTRACT

A steering system includes a steering unit including a first actuator; a turning unit including a second actuator; and a backup mechanism configured to mechanically couple the steering unit and the turning unit, wherein a maximum torque that the first actuator is able to transmit to the second actuator via the backup mechanism is larger than or equal to a maximum torque that the second actuator is able to transmit to the first actuator via the backup mechanism.

4 Claims, 4 Drawing Sheets

STEERING SYSTEM FOR VEHICLE

BACKGROUND OF THE INVENTION

1. Field of the Invention

The invention relates to a steering system for a vehicle. More particularly, the invention relates to a steer-by-wire steering system for a vehicle.

2. Description of Related Art

In recent years, development of a steer-by-wire system (hereinafter, SBW system) in which a steering unit including a steering wheel and a turning unit including a turning mechanism are mechanically separated from each other has been proceeding. The SBW system may include a backup mechanism including a clutch that mechanically couples the steering unit to the turning unit for the purpose of fail-safe. In the thus configured SBW system, the turning mechanism is controlled by an electric signal in response to operation of the steering wheel (hereinafter, SBW control) when the system is normal. On the other hand, when there occurs an abnormality in the SBW system, the clutch is quickly connected, SBW control is stopped, and the system is switched into assist control for reducing a burden on driver's steering.

However, if the clutch is connected although there is no abnormality in the SBW system, the steering wheel may rotate as a result of continuation of SBW control (in other words, operation of a turning actuator). In SBW control, the turning actuator is driven such that an actual steered angle of steered wheels follows a command steered angle. When the clutch is connected, the steering wheel and the turning mechanism are mechanically coupled to each other by the clutch. Therefore, when the turning actuator turns the steered wheels in SBW control, the steering wheel mechanically rotates in interlocking with the turn of the steered wheels, so the command steered angle changes (hereinafter, the phenomenon that the steering wheel is rotated through this operation may be simply described as that the steering wheel is rotated interlockingly). Therefore, the deviation between the command steered angle and the actual steered angle does not reduce, and self-steer may occur.

Japanese Patent Application Publication No. 2007-137294 (JP 2007-137294 A) describes a technique switching from SBW control to assist control when an SBW system determines that a clutch is connected in process of SBW control.

According to JP 2007-137294 A, because SBW control is executed until connection of the clutch is detected, there is an undeniable possibility that the steering wheel is rotated interlockingly in a period from when the clutch is connected to when SBW control is switched to assist control.

SUMMARY OF THE INVENTION

The invention provides a technique for reducing occurrence of self-steer due to connection of a clutch in process of SBW control in an SBW system.

An aspect of the invention provides a steering system. The steering system includes a steering unit including a first actuator; a turning unit including a second actuator; and a backup mechanism configured to mechanically couple the steering unit and the turning unit, wherein a maximum torque that the first actuator is able to transmit to the second actuator via the backup mechanism is larger than or equal to a maximum torque that the second actuator is able to transmit to the first actuator via the backup mechanism.

According to the above aspect, it is possible to reduce interlocking rotation of a steering wheel.

In the above aspect, the steering system may further include a control unit configured to set a generatable maximum torque of the second actuator on the basis of a vehicle state. Thus, it is possible to achieve steering control suitable for a vehicle state.

In the above aspect, when a vehicle speed is higher than a first predetermined value, the control unit may be configured to set the generatable maximum torque of the second actuator such that the maximum torque that the second actuator is able to transmit via the backup mechanism becomes smaller than or equal to the maximum torque that the first actuator is able to transmit via the backup mechanism. Thus, for example, it is allowed to employ a small-sized motor as the first actuator.

In the above aspect, when a steering angle is smaller than a second predetermined value, the control unit may be configured to set the generatable maximum torque of the second actuator such that the maximum torque that the second actuator is able to transmit via the backup mechanism becomes smaller than or equal to the maximum torque that the first actuator is able to transmit via the backup mechanism. Thus, for example, it is allowed to employ a small-sized motor as the first actuator.

According to the above aspect, it is possible to reduce occurrence of self-steer due to connection of a clutch in process of SBW control in an SBW system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
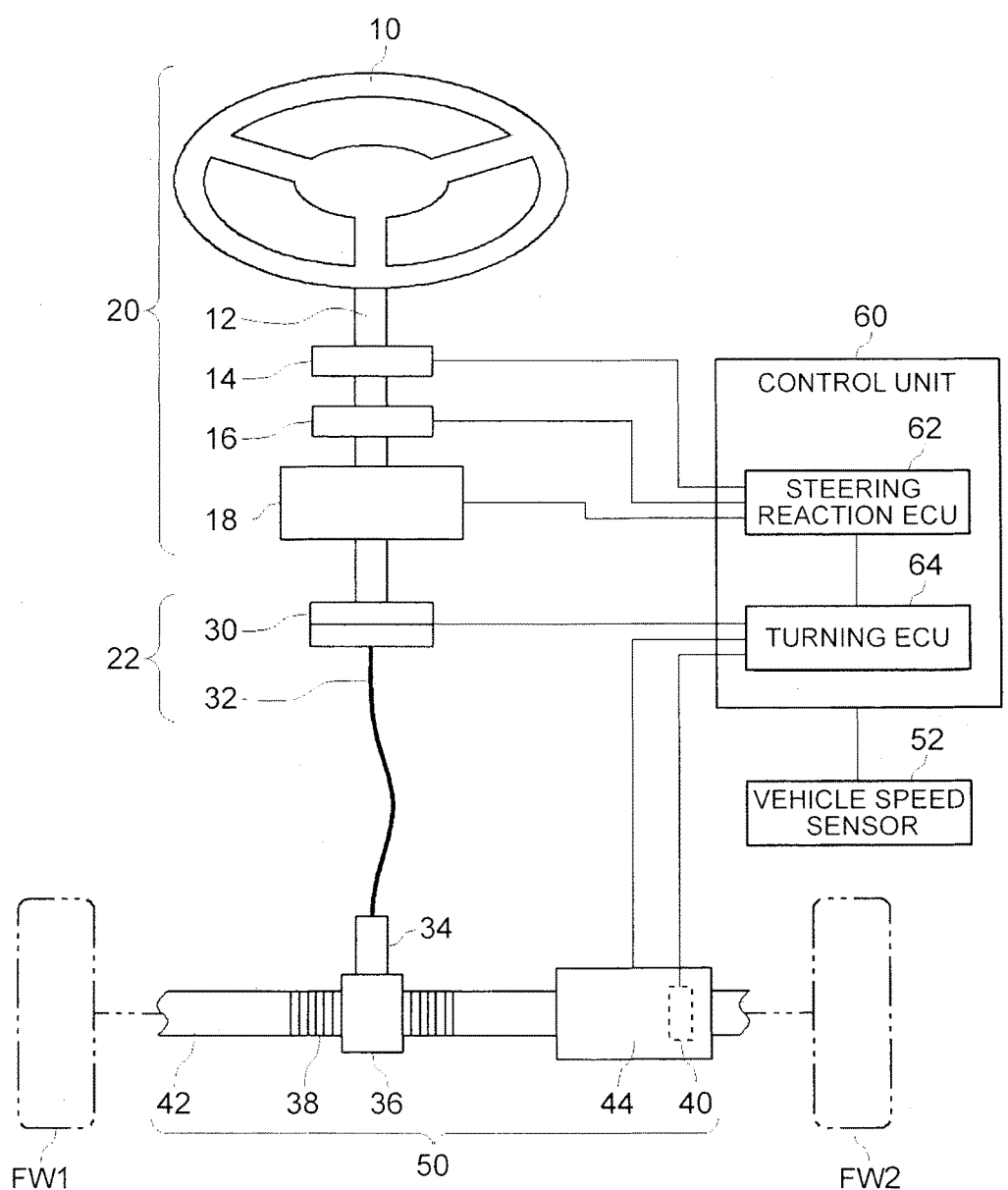
FIG. 1 is a view that shows the schematic configuration of a vehicle steering system according to an embodiment of the invention.

FIG. 1 shows the schematic configuration of a vehicle steering system 1 according to an embodiment of the invention. The vehicle steering system 1 includes a steering unit 20 and a turning unit 50. The steering unit 20 is steered by a driver. The turning unit 50 turns right and left front wheels FW2, FW1 in response to driver's steering. The right and left front wheels FW2, FW1 are steered wheels. An SBW system is employed as the vehicle steering system 1. When the system is normal, the steering unit 20 and the turning unit 50 are mechanically separated from each other by a clutch 30. In the example shown in FIG. 1, a state where the clutch 30 is connected and the steering unit 20 and the turning unit 50 are mechanically coupled to each other is shown.

The steering unit 20 includes a steering wheel 10, a steering shaft 12, a steering angle sensor 14, a steering torque sensor 16 and a steering reaction actuator 18. The steering wheel 10 is a steering member that is rotationally operated by the driver, and is fixed to the top of the steering shaft 12. The steering reaction actuator 18 includes a steering reaction motor for generating steering reaction, and is assembled to the lower portion of the steering shaft 12. The steering reaction motor rotationally drives the steering shaft 12 around the axis of the steering shaft 12. The steering angle sensor 14 detects a steering angle of the steering wheel 10 that is rotationally operated by the driver. The steering torque sensor 16 detects a steering torque that is applied to the steering wheel 10.

The turning unit 50 includes a rack bar 42 and a turning actuator 44. The rack bar 42 extends in the transverse direction of a vehicle. The right and left front wheels FW2, FW1 are turnably connected to both ends of the rack bar 42 via corresponding tie rods and knuckle arms (not shown). The right and left front wheels FW2, FW1 are turned right and left by displacement of the rack bar 42 in, the axial direction. The turning actuator 44 includes a turning motor provided around the rack bar 42. Rotation of the turning motor is converted to displacement of the rack bar 42 in the axial direction. A rotation angle sensor 40 detects a rotation angle of the turning motor.

The turning unit 50 further includes a turning shaft 34, a pinion gear 36 and rack teeth 38. The turning shaft 34 is rotatable around its axis. The pinion gear 36 is fixed to the lower end of the turning shaft 34. The pinion gear 36 is in mesh with the rack teeth 38 of the rack bar 42. Thus, the turning shaft 34 rotates around its axis in interlocking with displacement of the rack bar 42 in the axial direction.

The vehicle steering system 1 includes a backup mechanism 22 between the steering unit 20 and the turning unit 50 for the purpose of fail-safe. The backup mechanism 22 includes the clutch 30 and a backup cable 32. The backup mechanism 22 has the function of mechanically coupling or separating the steering unit 20 to or from the turning unit 50. The backup cable 32 has flexibility. The upper end of the backup cable 32 is connected to the clutch 30, and the lower end of the backup cable 32 is connected to the turning shaft 34. Thus, the turning shaft 34 integrally rotates with the backup cable 32. The clutch 30 is an electromagnetic clutch, such as a two-way clutch and a multi-disk clutch. The clutch 30 is supplied with current and is set to a disconnected state (separated state) when the vehicle steering system 1 is normal; whereas supply of current to the clutch 30 is stopped and the clutch 30 is set to a connected state by spring force, or the like, when the vehicle steering system 1 is abnormal. Therefore, when supply of current is stopped, the steering shaft 12 of the steering unit 20 and the turning shaft 34 of the turning unit 50 integrally rotate via the connected clutch 30.

A control unit 60 is control means that is formed of a steering reaction ECU 62 and a turning ECU 64. The steering reaction ECU 62 executes drive control over the steering reaction actuator 18. The turning ECU 64 executes drive control over the turning actuator 44. The steering reaction ECU 62 receives a detected steering angle from the steering angle sensor 14, and receives a detected steering torque from the steering torque sensor 16. The turning ECU 64 receives a detected rotation angle of the turning motor in the turning actuator 44 from the rotation angle sensor 40.

When the system is normal, the turning ECU 64 sets the clutch 30 to the disconnected state by supplying current to the clutch 30. When the driver rotationally operates the steering wheel 10, the steering reaction ECU 62 receives the detected steering angle from the steering angle sensor 14, and transmits the detected steering angle to the turning ECU 64. The turning ECU 64 obtains a command steered angle of the right and left front wheels FW2, FW1 based on the operating state of the steering wheel 10, and drives the turning actuator 44 such that the command steered angle is attained. Specifically, the turning ECU 64 derives an actual steered angle of the right and left front wheels FW2, FW1 on the basis of the detected rotation angle received from the rotation angle sensor 40, and drives the turning actuator 44 such that the actual steered angle follows the command steered angle. The steering reaction ECU 62 drives the steering reaction actuator 18 such that a command steering reaction torque based on the steering angle of the steering wheel 10 and the steered state of the right and left front wheels FW2, FW1 is applied to the steering wheel 10. In this way, when the system is normal, in a state where the steering unit 20 and the turning unit 50 are separated from each other, the control unit 60 executes SBW control in which the steered wheels are turned while steering reaction is applied to the steering wheel 10.

On the other hand, when the system is abnormal, the turning ECU 64 sets the clutch 30 to the connected state by stopping supply of current to the clutch 30. Thus, the steering shaft 12 and the turning shaft 34 are mechanically coupled. The control unit 60 stops SBW control, and executes assist control. In assist control, at least one of the steering reaction actuator 18 and the turning actuator 44 is driven such that assist torque is applied to driver's operation on the basis of the detected steering torque from the steering torque sensor 16. For example, the control unit 60 executes assist control for driving the turning actuator 44 when the steering reaction actuator 18 is abnormal, and executes assist control for driving the steering reaction actuator 18 when the turning actuator 44 is abnormal. In this way, when the system is abnormal, in a state where the steering unit 20 and the turning unit 50 are coupled, the control unit 60 executes assist control for adding assist torque to the steering wheel 10. The control unit 60 desirably immediately switches from SBW control to assist control at the timing at which occurrence of a system abnormality is detected.

Incidentally, the clutch 30 has such a structure that spring force acts on the clutch 30 in the connecting direction as described above. When current is supplied, the clutch 30 should be released and keep the disconnected state. However, the clutch 30 may be erroneously connected by the action of spring force. When the clutch 30 is erroneously connected, the control unit 60 desirably detects occurrence of a system abnormality and switches from SBW control to assist control. However, in a period from the timing at which the clutch 30 is actually erroneously connected to the timing at which SBW control is stopped, SBW control is executed for driving the turning actuator 44 such that the actual steered angle of the steered wheels follows the command steered angle.

The vehicle steering system 1 includes clutch state detecting means (not shown) for detecting whether the clutch 30 is in the connected state or the separated state. When the connected state is detected by the clutch state detecting means although current is supplied to the clutch 30, the control unit 60 may determine that the clutch 30 is erroneously connected and detect that there occurs an abnormality in the system.

Figure 2:
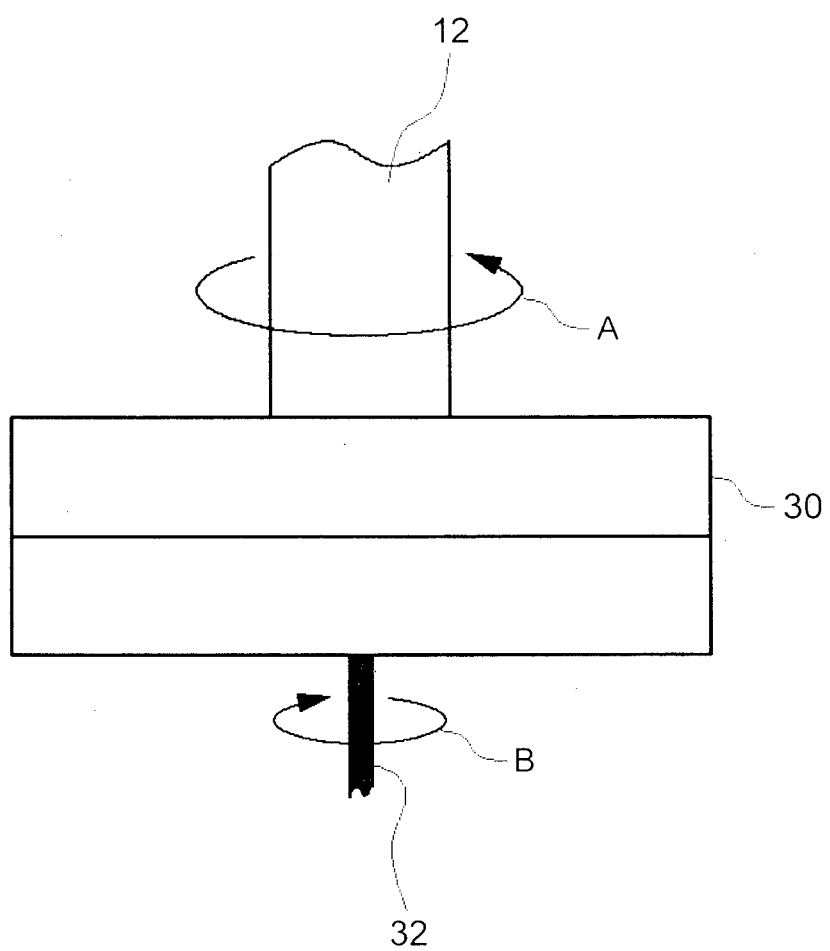
FIG. 2 is a view that shows the relationship between torque that a steering reaction actuator transmits via a clutch and torque that a turning actuator transmits via the clutch.

FIG. 2 shows the relationship between torque that the steering reaction actuator 18 transmits via the clutch 30 and torque that the turning actuator 44 transmits via the clutch 30. The steering reaction motor of the steering reaction actuator 18 serves to apply steering reaction to the steering wheel 10. The turning motor of the turning actuator 44 serves to turn the right and left front wheels FW2, FW1.

Because the turning motor needs to generate large turning torque particularly at the time of stationary steering, a maximum torque outputtable by the turning motor is considerably larger than a maximum torque outputtable by the steering reaction motor in an existing steering system. Therefore, in the existing steering system, when the clutch 30 is erroneously connected in process of SBW control, torque generated by the turning actuator 44 is transmitted to the steering wheel 10 via the backup mechanism 22, and the steering wheel 10 is rotated interlockingly.

Therefore, in the vehicle steering system 1 according to the present embodiment, a maximum torque A that the steering reaction actuator 18 is able to transmit to the turning actuator 44 via the backup mechanism 22 is larger than or equal to a maximum torque B that the turning actuator 44 is able to transmit to the steering reaction actuator 18 via the backup mechanism 22. By setting driving conditions of the steering reaction actuator 18 and turning actuator 44 such that the maximum torque A becomes larger than or equal to the maximum torque B, torque generated by the turning actuator 44 is allowed to be cancelled by torque generated by the steering reaction actuator 18 in a torque transmission path between the steering reaction actuator 18 and the turning actuator 44.

During SBW control, the steering reaction ECU 62 obtains a command steering reaction torque that is applied to the steering wheel 10 on the basis of at least the steering angle of the steering wheel 10, detected by the steering angle sensor 14, and drives the steering reaction actuator 18. In the case where the clutch 30 is in the connected state, when the turning ECU 64 drives the turning actuator 44 such that the actual steered angle of the steered wheels follows the command steered angle, the driver adds force to the steering wheel 10 in the return direction such that the steering wheel 10 is not rotated interlockingly. The steering reaction ECU 62 derives an actual steering reaction torque that is actually applied to the steering wheel 10 from the detected steering torque received from the steering torque sensor 16. When the steering reaction ECU 62 detects a deviation between the actual steering reaction torque and the command steering reaction torque, the steering reaction ECU 62 drives the steering reaction actuator 18 such that the deviation is reduced.

In this way, when the clutch 30 is connected in process of SBW control, the steering reaction actuator 18 and the turning actuator 44 each generate torque in a direction to cancel torque from the other side. At this time, in the vehicle steering system 1, because the maximum torque A that the steering reaction actuator 18 is able to transmit via the backup mechanism 22 is set so as to be larger than or equal to the maximum torque B that the turning actuator 44 is able to transmit via the backup mechanism 22, even if the maximum torque B is transmitted from the turning actuator 44, the steering reaction actuator 18 is able to generate torque that cancels the maximum torque B. Therefore, it is possible to reduce occurrence of self-steer, that is, rotation of the steering wheel 10 interlockingly. When the maximum torque A is larger than the maximum torque B, not only it is allowed to cancel torque that is transmitted from the turning actuator 44 via the backup mechanism 22 but also the steering reaction actuator 18 is allowed to apply appropriate steering reaction torque to the steering wheel 10. In this way, by using the steering reaction motor having a higher rating than the existing one, it is possible to reduce occurrence of self-steer by effectively utilizing the feature of SBW control at the time of erroneous connection of the clutch 30 without necessity to determine whether the clutch 30 is erroneously connected. As described above, the control unit 60 may immediately switch from SBW control to assist control after a system abnormality due to erroneous connection of the clutch 30 is detected.

Generally, a motor having a high rating is larger and more expensive than a motor having a lower rating. Therefore, a technical idea for making it possible to reduce occurrence of self-steer due to connection of the clutch 30 even when a steering reaction motor having a lower rating than a turning motor is used as in the case of the existing steering system will be described below. In the following example, the control unit 60 sets a generatable maximum torque of the turning actuator 44 on the basis of a vehicle state. An example in which the vehicle state includes a vehicle speed and a steering angle (steered angle) will be described below; however, a generatable maximum torque of the turning actuator 44 may be set on the basis of another state.

As described above, in the turning actuator 44, a turning motor having a large outputtable maximum torque is used so as to be able to sufficiently turn the steered wheels at the time of stationary steering. Considering a steered torque required for turning in terms of a vehicle speed range, a turning torque required while traveling at a vehicle speed of 0 to a minute low speed (0 to 5 km/h) is larger than a turning torque required while traveling at a low speed, an intermediate speed or a high speed. In other words, the turning actuator 44 does not need to generate a large turning torque in a vehicle speed range over a predetermined speed (for example, 5 km/h), and limiting the maximum torque of the turning actuator 44 does not impair turning during traveling. That is, in a vehicle speed range over the predetermined speed, the generatable maximum torque of the turning actuator 44 is allowed to be set so as to be lower than the rating.

Figure 3:
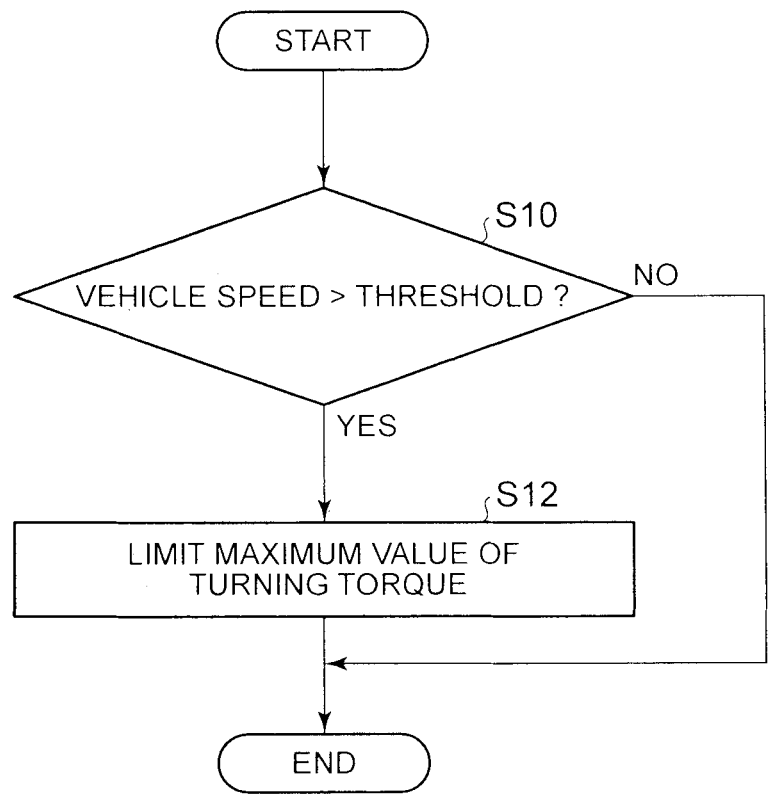
FIG. 3 is a view that shows an example of a flowchart for limiting a maximum value of turning torque.

FIG. 3 shows an example of a flowchart for limiting the maximum value of turning torque. Here, a current value required at the time of generating the rated maximum torque of the turning motor is Ia. The turning ECU 64 receives a detected vehicle speed from a vehicle speed sensor 52, and obtains a vehicle speed. When the vehicle speed is higher than a threshold (for example, 5 km/h) (Y in S10), the turning ECU 64 limits the maximum value of turning torque that is generated by the turning actuator 44 (S12). Specifically, the turning ECU 64 sets Ib (<Ia) for the maximum current value that is supplied to the turning motor, thus setting the generatable maximum torque such that the generatable maximum torque is smaller than the rated maximum torque. On the other hand, when the vehicle speed is lower than or equal to the threshold (N in S10), the turning ECU 64 sets the generatable maximum torque to the rated maximum torque, thus setting the supplied maximum current value to Ia.

The maximum value of turning torque, limited in S12, will be described. Initially, the maximum value of turning torque needs to be a value enough to turn the steered wheels when the vehicle speed is higher than the threshold. Subsequently, as described with reference to FIG. 2, in order to reduce occurrence of self-steer due to erroneous connection of the clutch 30, the maximum torque A that the steering reaction actuator 18 is able to transmit via the backup mechanism 22 needs to be larger than or equal to the maximum torque B that the turning actuator 44 is able to transmit via the backup mechanism 22.

Thus, when the vehicle speed is higher than the threshold, the, turning ECU 64 sets the generatable maximum torque of the turning actuator 44 such that the maximum torque that the turning actuator, 44 is able to transmit via the backup mechanism 22 is smaller than or equal to the maximum torque that the steering reaction actuator 18 is able to transmit via the backup mechanism 22. Thus, even when turning torque generated by the turning actuator 44 is transmitted via the backup mechanism 22, the turning torque is allowed to be cancelled by torque that is generated by the steering reaction actuator 18. In this way, by changing the generatable maximum torque of the turning actuator 44 on the basis of the vehicle speed range, it is possible to reduce occurrence of self-steer due to erroneous connection of the clutch 30 in the case where the vehicle speed is higher than the threshold even when the steering reaction actuator 18 includes a steering reaction motor having a low rating.

When the vehicle speed is lower than or equal to the threshold, by setting the maximum value of supplied current to Ia such that the turning motor is able to generate the rated maximum torque, the turning actuator 44 is allowed to turn the steered wheels even at the time of, for example, stationary steering. If the clutch 30 is erroneously connected at this time, there is a possibility that self-steer occurs; however, it is possible to suppress the influence of self-steer on vehicle behavior to a significantly lesser degree because of a minute low speed. In the above description, when the vehicle speed falls within the minute low vehicle speed range (0 to 5 km/h) in S10, the rated maximum torque of the turning motor is not limited. Instead, the rated maximum torque of the turning motor may not be limited only during a vehicle stop by setting the threshold to 0 km/h in order to minimize the influence of self-steer on vehicle behavior.

Next, turning torque required for turning in terms of the steering angle will be studied. For example, at the time of stationary steering, the maximum turning torque is required around the ends of the range in which the steered wheels are turnable, that is, around points at which the steered angle of the steered wheels is maximum. In other words, when the steered angle of the steered wheels is smaller than a predetermined value (a value just before the maximum value of the steered angle), the turning actuator 44 does not need to generate large turning torque, and turning is not impaired even when the maximum torque of the turning actuator 44 is limited. That is, when the steered angle is smaller than the predetermined value, the generatable maximum torque of the turning actuator 44 is allowed to be set so as to be smaller than the rating. Therefore, an example in which the turning ECU 64 limits the maximum value of turning torque, by using the steering angle of the steering wheel 10 at the time when the steered angle of the steered wheels becomes a predetermined value, will be described.

Figure 4:
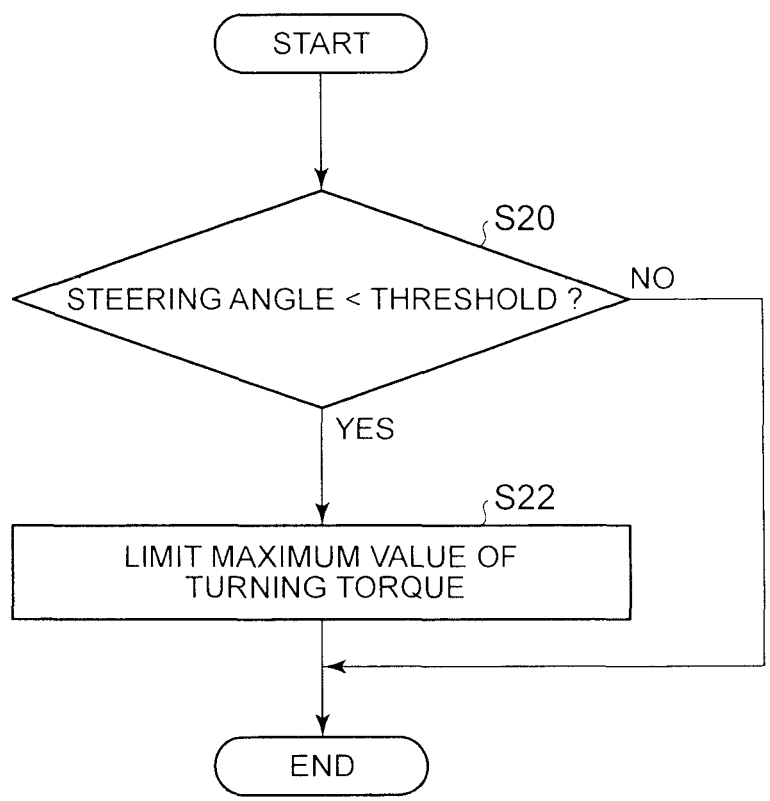
FIG. 4 is a view that shows another example of a flowchart for limiting a maximum value of turning torque.

FIG. 4 shows another example of a flowchart for limiting the maximum value of turning torque. The turning ECU 64 receives the detected steering angle from the steering angle sensor 14 via the steering reaction ECU 62, and acquires the steering angle of the steering wheel 10. When the steering angle is smaller than a threshold (Y in S20), the turning ECU 64 limits the maximum value of turning torque generated by the turning actuator 44 (S22). Specifically, the turning ECU 64 sets Ib (<Ia) for the maximum current value that is supplied to the turning motor, thus setting the generatable maximum torque such that the generatable maximum torque is smaller than the rated maximum torque. On the other hand, when the steering angle is larger than or equal to the threshold (N in S20), the turning ECU 64 sets the generatable maximum torque to the rated maximum torque, thus setting the supplied maximum current value to Ia. The threshold to be compared with the steering angle in S20 is the steering angle at the time when the steered angle of the steered wheels becomes the predetermined value as described above.

The maximum value of turning torque, which is limited in S22, may be the same as the maximum value of turning torque, which is limited in S12. When the steering angle is smaller than the threshold, the turning ECU 64 sets the generatable maximum torque of the turning actuator 44 such that the maximum torque that the turning actuator 44 is able to transmit via the backup mechanism 22 becomes smaller than or equal to the maximum torque that the steering reaction actuator 18 is able to transmit via the backup mechanism 22. In this way, by changing the generatable maximum torque of the turning actuator 44 on the basis of the vehicle speed range, it is possible to reduce occurrence of self-steer due to erroneous connection of the clutch 30 in the case where the steering angle is smaller than the threshold even when the steering reaction actuator 18 includes a steering reaction motor having a low rating.

When the steering angle is larger than or equal to the threshold, by setting the maximum value of supplied current to Ia such that the turning motor is able to generate the rated maximum torque, the turning actuator 44 is allowed to turn the steered wheels even, for example, around the ends at the time of stationary steering. At this time, when the clutch 30 is erroneously connected, there is a possibility that self-steer occurs; however, the steered wheels are turned to around the ends only when the vehicle speed is 0 or minute low speed, so it is possible to suppress the influence of self-steer on vehicle behavior to a significantly lesser degree.

The invention is described on the basis of the embodiment. However, the embodiment is only illustrative, and it should be understood by persons skilled in the art that various modifications are applicable in combinations of components and processes and the invention also encompasses such modifications.

In the flowchart shown in FIG. 4, the maximum value of turning torque is limited on the basis of the steering angle; instead, the maximum value of turning torque may be limited on the basis of not the steering angle but the steered angle. The two flowcharts for limiting the maximum value of turning torque are shown in FIG. 3 and FIG. 4; and these two flowcharts may be utilized in AND condition or OR condition. The case where the two flowcharts are utilized in AND condition means that step of S12 (or S22) is executed when both Y in S10 and Y in S20 are satisfied. The case where the two flowcharts are utilized in OR condition means that the control unit 60 executes the two flowcharts independently.

What is claimed is:

1. A steering system comprising:
 a steering unit including a first actuator;
 a turning unit including a second actuator; and
 a backup mechanism configured to mechanically couple the steering unit and the turning unit, wherein
 a maximum torque that the first actuator is able to transmit to the second actuator via the backup mechanism is larger than or equal to a maximum torque that the second actuator is able to transmit to the first actuator via the backup mechanism.

2. The steering system according to claim 1, further comprising:
 a control unit configured to set a generatable maximum torque of the second actuator on a basis of a vehicle state.

3. The steering system according to claim 2, wherein the control unit is configured to set, when a vehicle speed is higher that a first predetermined value, the generatable maximum torque of the second actuator such that the maximum torque that the second actuator is able to transmit via the backup mechanism becomes smaller than or equal to the maximum torque that the first actuator is able to transmit via the backup mechanism.

4. The steering system according to claim 2, wherein the control unit is configured to set, when a steering angle is smaller than a second predetermined value, the generatable maximum torque of the second actuator such that the maximum torque that the second actuator is able to transmit via the backup mechanism becomes smaller than or equal to the maximum torque that the first actuator is able to transmit via the backup mechanism.

* * * * *